(12) United States Patent
Iacona

(10) Patent No.: US 8,056,180 B2
(45) Date of Patent: Nov. 15, 2011

(54) GROUND LEAF BLOWER WITH HOSE ATTACHMENT

(75) Inventor: Fernando R. Iacona, Fountian Hills, AZ (US)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 12/639,189

(22) Filed: Dec. 16, 2009

(65) Prior Publication Data

US 2010/0146730 A1    Jun. 17, 2010

Related U.S. Application Data

(60) Provisional application No. 61/201,859, filed on Dec. 16, 2008.

(51) Int. Cl.
*A47L 5/00* (2006.01)
*A47L 5/14* (2006.01)

(52) U.S. Cl. .......... 15/312.2; 15/314; 15/316.1; 15/318; 15/345; 15/405

(58) Field of Classification Search ........ 15/312.2, 15/314, 316.1, 318, 345, 346, 405; *A47L 5/00, A47L 5/14*
See application file for complete search history.

(56) References Cited

U.S. PATENT DOCUMENTS

| | | | |
|---|---|---|---|
| 4,118,826 A | 10/1978 | Kaeser | |
| 5,107,566 A * | 4/1992 | Schmid | 15/338 |
| 5,735,018 A * | 4/1998 | Gallagher et al. | 15/405 |
| 6,073,305 A * | 6/2000 | Hesskamp | 15/405 |
| 6,253,416 B1 * | 7/2001 | Lauer et al. | 15/361 |
| 6,370,729 B2 | 4/2002 | Miyamoto | |
| 7,185,393 B2 | 3/2007 | Dahlberg et al. | |
| 7,300,484 B2 | 11/2007 | Scully et al. | |
| 7,823,252 B2 * | 11/2010 | Labrasciano | 15/405 |

* cited by examiner

*Primary Examiner* — David Redding
(74) *Attorney, Agent, or Firm* — Brian G. Gilpin; Godfrey & Kahn, S.C.

(57) ABSTRACT

A mobile leaf blower includes a main blower assembly driven by an engine or motor. The blower has a deflector box at the blower outlet with deflector plates which enable the air flow to be either directed laterally and forwardly of the blower unit or to a flexible blower tube attached to the unit. The operator may either cause the air flow to flow through the flexible blower tube or forwardly and laterally of the blower unit along the ground. When not in use, the flexible blower tube can be wound around a hose reel attached to the main handles of the ground blower unit.

4 Claims, 18 Drawing Sheets

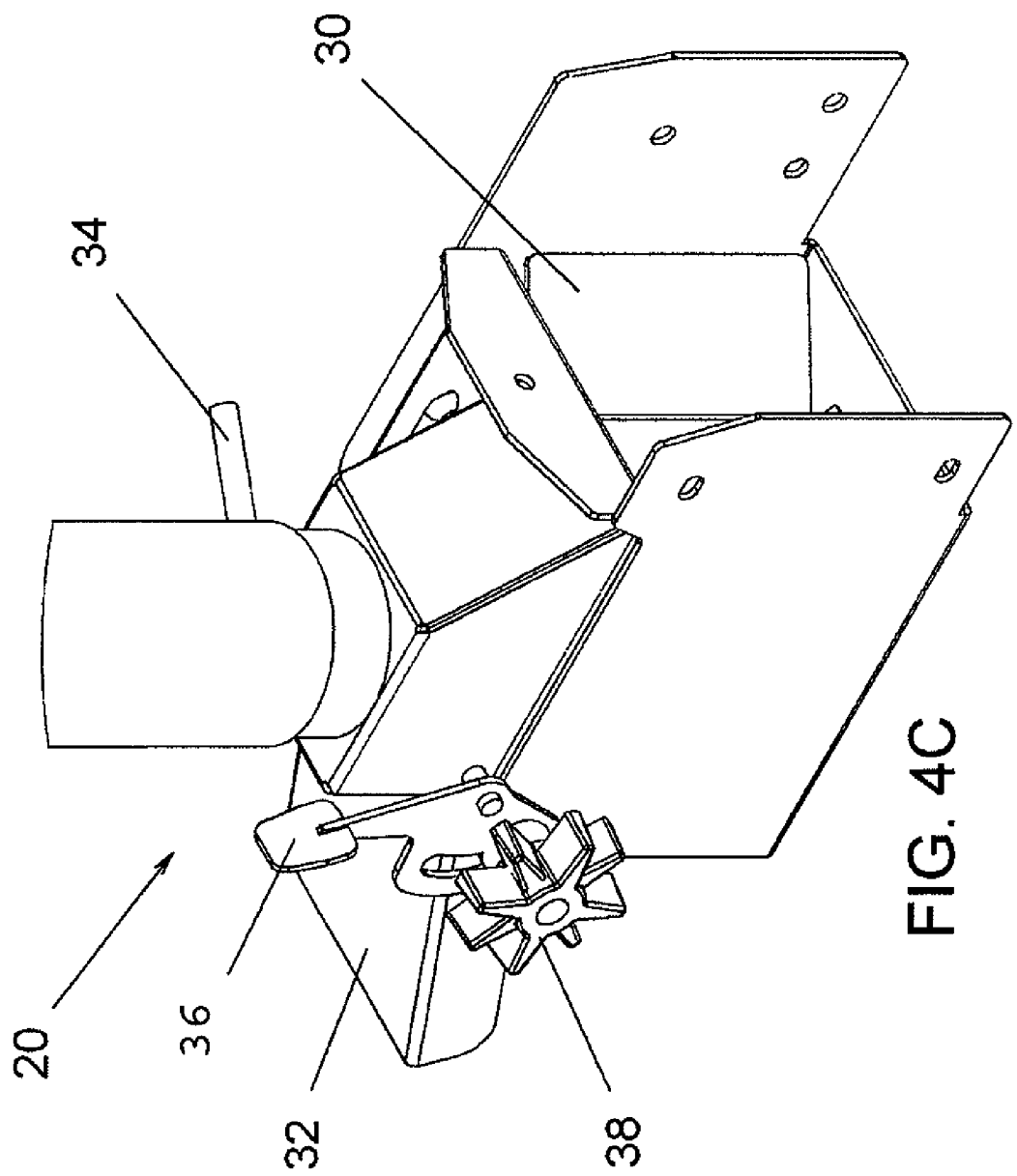

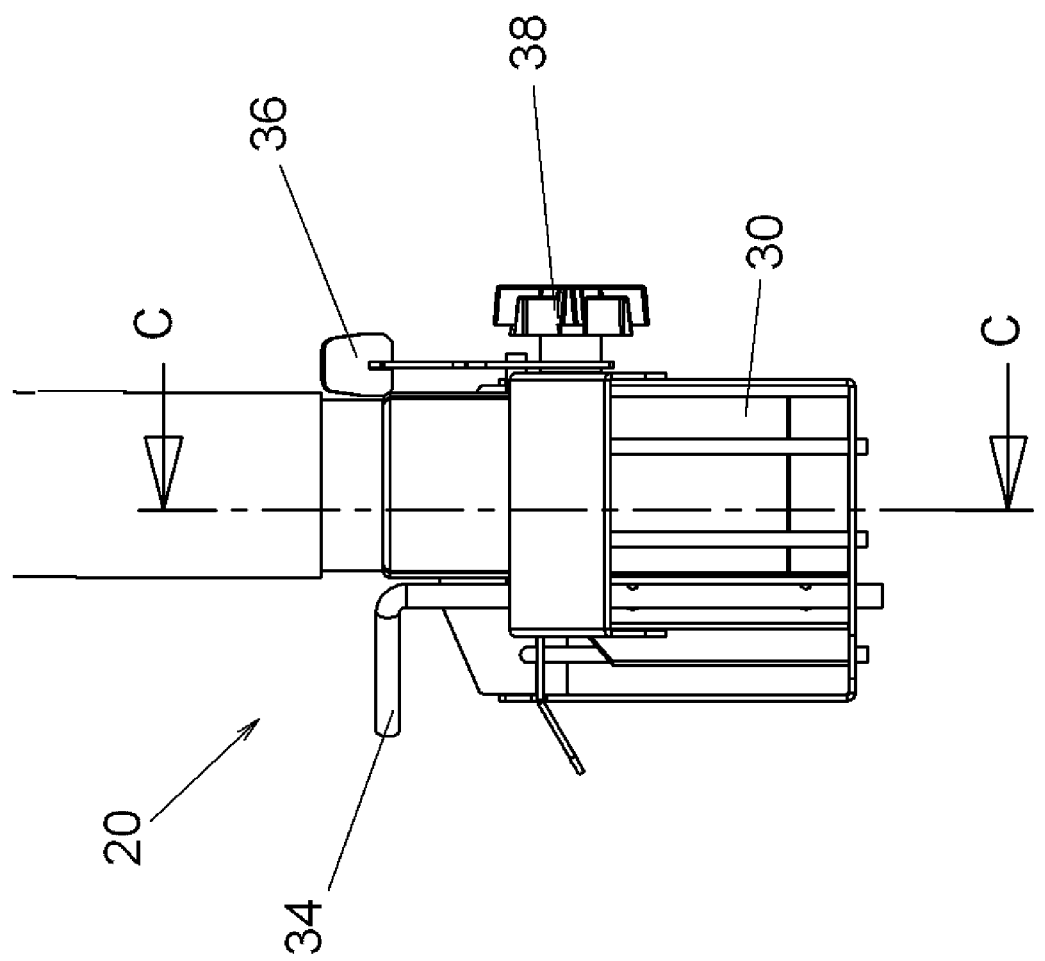

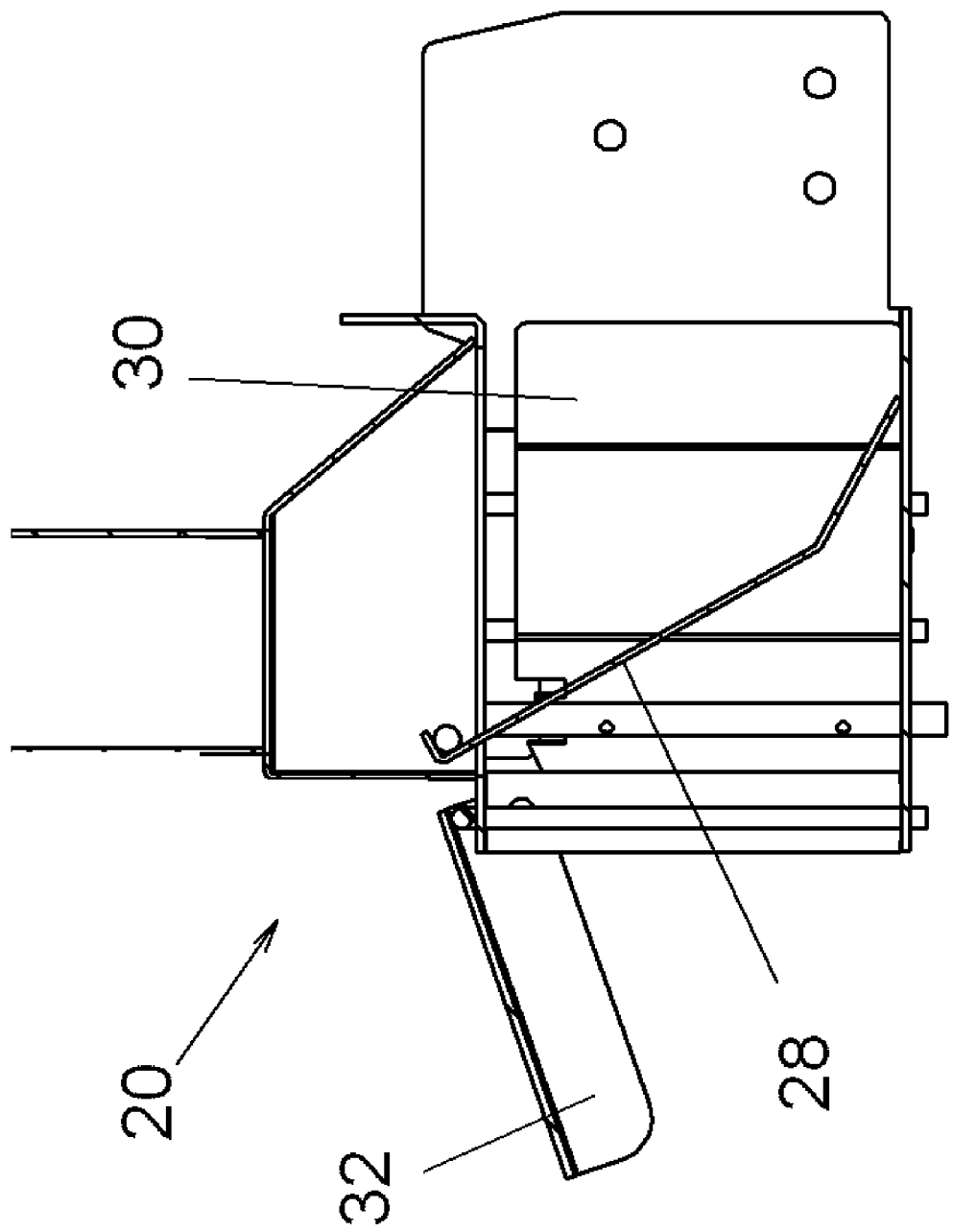

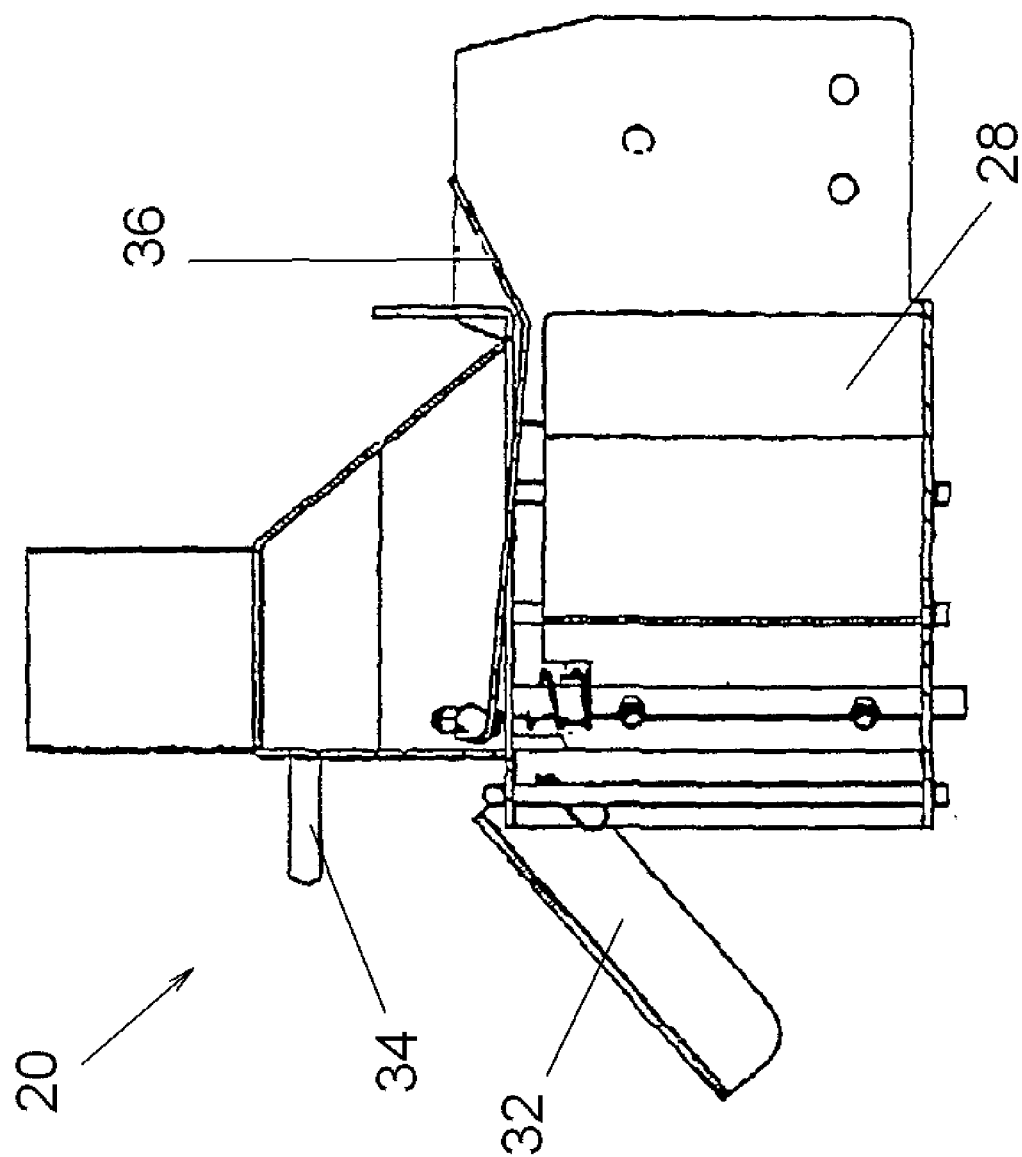

GROUND LEAF BLOWER WITH HOSE ATTACHMENT

CROSS-REFERENCE TO RELATED APPLICATION

This application is based on and claims priority from U.S. Provisional Patent Application No. 61/201,859 filed on Dec. 16, 2008, which is incorporated herein by reference in its entity for all purposes.

FIELD OF THE INVENTION

The subject invention generally relates to a ground leaf blower for removing leaves and other debris from driveways and lawn surfaces. More specifically, it relates to an improved mobile ground leaf blower that includes a hose attachment connected to the blower through a deflector assembly which enables the air to be directed through the hose assembly. Alternatively, the deflector assembly can direct the air flow toward the ground in front of and to the side of the blower unit.

BACKGROUND

A prior art mobile blower unit for leaves and other debris is disclosed in U.S. Pat. No. 4,118,826 to Kaeser, the disclosure of which is incorporated herein by reference for all purposes. Kaeser discloses an internal combustion engine mounted on a frame supported by a set of wheels with a shaft connected to the engine to drive a blower impeller. The blower housing is mounted so as to be capable of rotating on an axis of the engine shaft. The blower housing has a center inlet, a laterally projecting tangential outlet, and a movable air deflector mounted on the housing adjacent the outlet. The air deflector is actuated by an elongated control rod which extends from the handle assembly projecting rearwardly and upwardly from the frame, and a control rod permits the operator to actuate the air deflector when the blower outlet and deflector are located at either a high position on one side of the frame or a low position on the opposite side of the frame. In the Kaeser device, the mobile blower unit is provided with a formed tubular steel leg member which extends across the front of the screen of the centrifugal blower unit and has rearward end portions rigidly secured to the engine support frame. By this arrangement, when the Kaeser mobile blower unit is tilted forwardly, the support leg member engages the ground or other supporting surface.

Another form of mobile blower unit is of the type wherein the blower unit is carried on a frame which is supported on the back of the user, and the blower unit is connected to an elongated blower tube which is guided by the worker in order to remove grass and debris from generally inaccessible places, such as under hedges or in flower beds. Examples of leaf blower units which are mounted on a frame that is carried by the user are disclosed in U.S. Pat. No. 6,370,729 to Miyamoto, U.S. Pat. No. 7,300,484 to Scully et al., and U.S. Pat. No. 7,185,393 to Dahlberg et al.

Although the Kaeser mobile blower unit has operated satisfactorily and is an improvement over prior existing mobile blower units, the Kaeser mobile blower unit is difficult to operate in flower beds and beneath shrubs and the like in order to remove leaves thereunder. Similarly, although the mobile blower units that are carried on a frame on the back of the user operate satisfactorily for their intended purpose, they cause a strain on the user, and have limited blower capability whereby they are primarily used to remove leaves from under shrubs, and are inefficient when it comes to blowing leaves in a long driveway or across a large lawn.

Accordingly, there is a need for a ground leaf blower unit which is capable of clearing large grass areas and driveways, while at the same time having the capability of blowing leaves from confined locations under shrubs and the like. Such a blower should ideally be simple in construction, low cost to manufacture, of sturdy construction and smooth operation, and wheel mounted so that the user does not carry a heavy blower unit during a cleaning operation. These and other objects of the subject invention will become apparent to those skilled in the art from the accompanying drawings and the following detailed description.

SUMMARY OF THE INVENTION

A mobile leaf blower of the subject invention includes a main blower assembly similar to the blower unit disclosed in U.S. Pat. No. 4,118,826 to Kaeser. The blower further includes a deflector box at the blower outlet including deflector plates which enable the air flow to be either directed laterally and forwardly of the blower unit or to a flexible blower tube attached to the unit. With this arrangement, the operator may either cause the air flow to flow through the blower tube in order to remove debris from under shrubs or actuate the deflector unit so that the main air flows forwardly and laterally of the blower unit along the ground. When not in use, the flexible blower tube can be wound around a hose reel attached to the main handles of the ground blower unit.

It will be understood by those skilled in the art that one or more aspects of this invention can meet certain objectives, while one or more other aspects can lead to certain other objectives. Other objects, features, benefits and advantages of the present invention will be apparent in this summary and descriptions of the preferred embodiments, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 4C is a detailed rear perspective view of the air deflector box of FIG. 4A, shown removed from the blower unit and with the deflector plate handle in the up position;

FIG. 5B is side elevational view of the air deflector box of FIG. 4B, with the deflector plate handle in the up position;

FIG. 5C is a cross-section of the air deflector box of FIG. 4B, taken generally along the line C-C in FIG. 5B, with the deflector plate handle in the up position;

FIG. 6C is a cross-section of the air deflector box of FIG. 4B, taken generally along the line C-C in FIG. 6B, with the deflector plate handle in the down position;

DETAILED DESCRIPTION OF THE PREFERRED EMBODIMENTS

Figure 1:
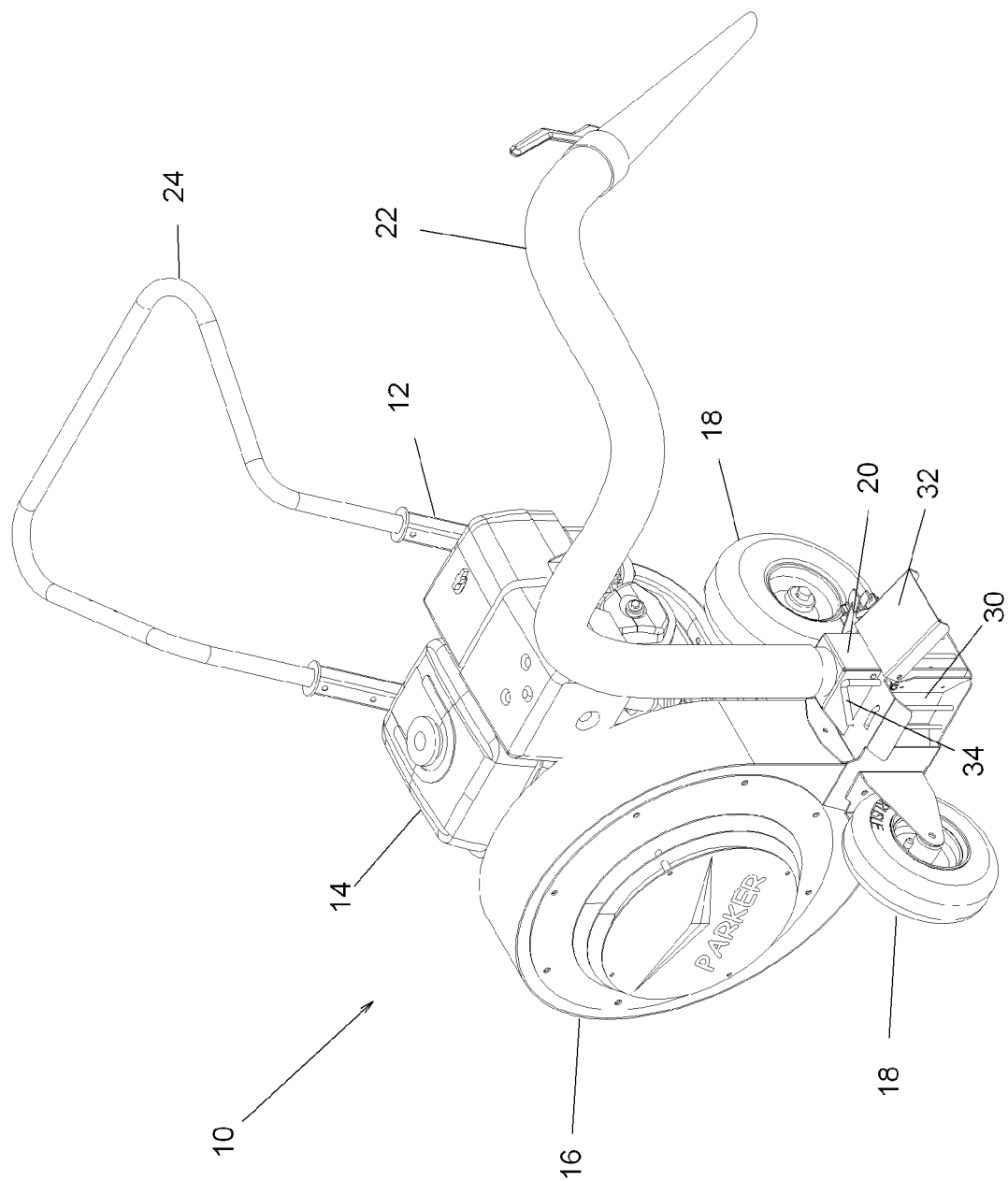
FIG. 1 is a front perspective view of one embodiment of a mobile ground blower unit in accordance with the invention.
Figure 2:
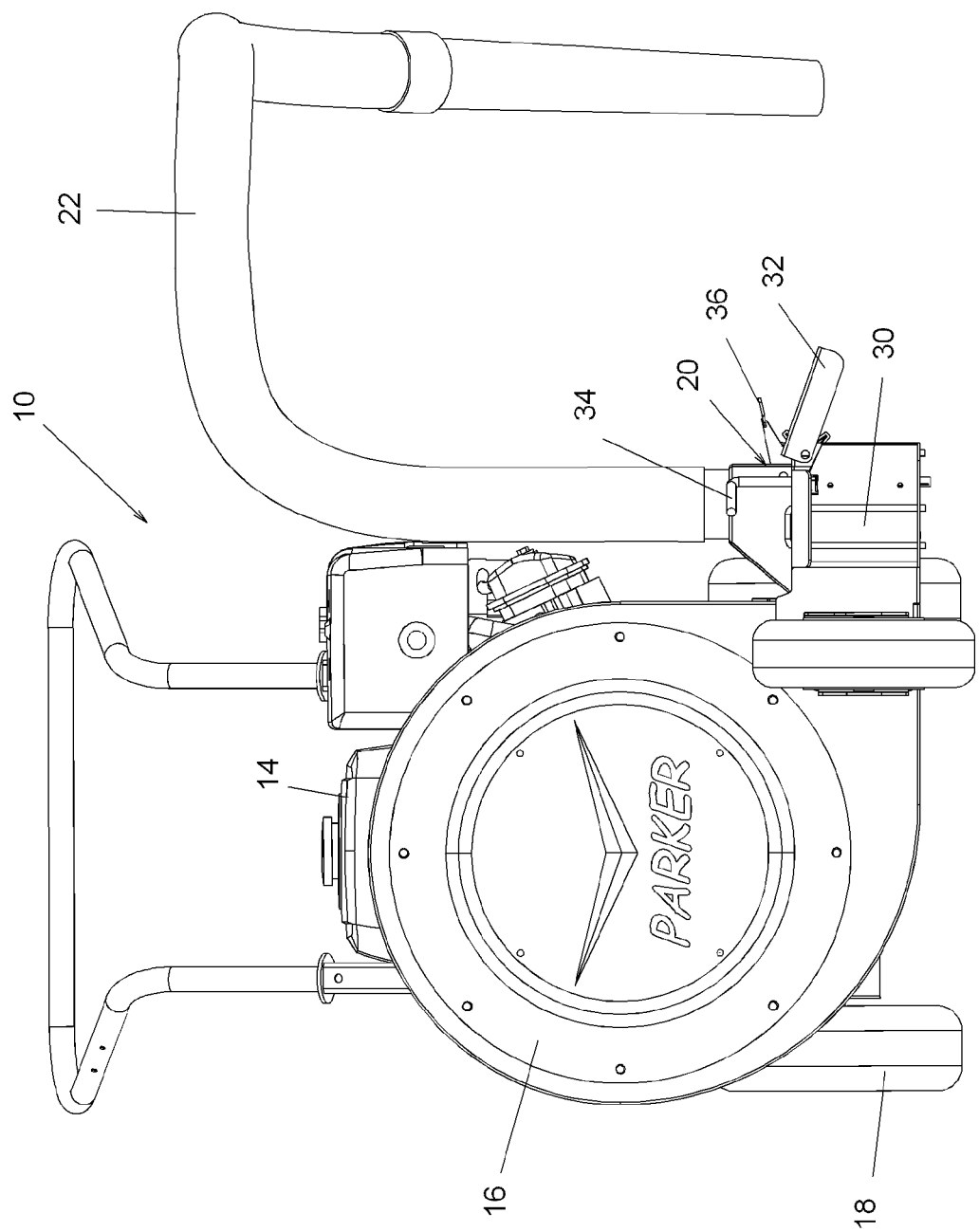
FIG. 2 is a front elevational view of the mobile ground leaf blower unit shown in FIG. 1.
Figure 3:
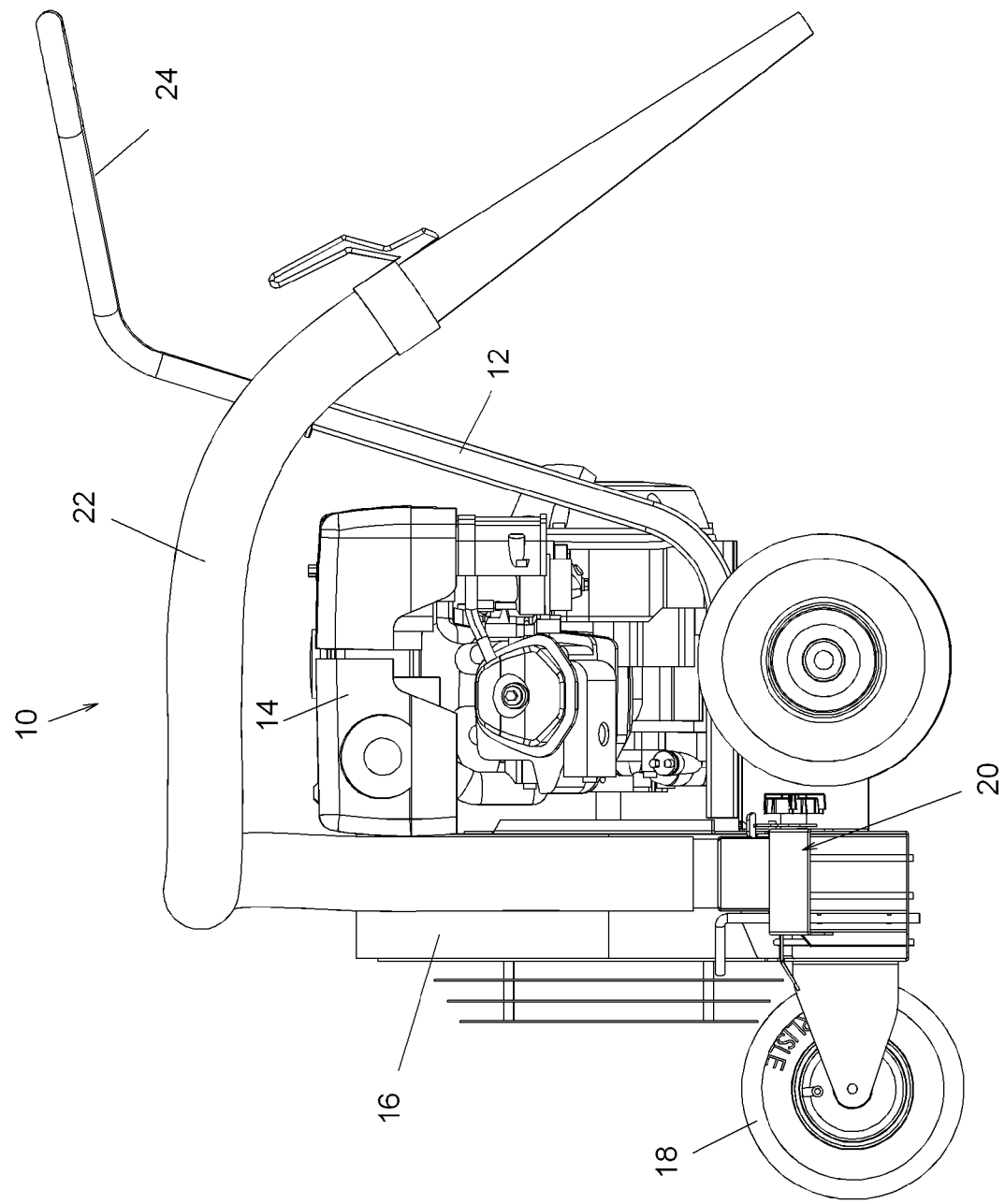
FIG. 3 is a side elevational view of the mobile ground leaf blower unit shown in FIG. 1.
Figure 8A:
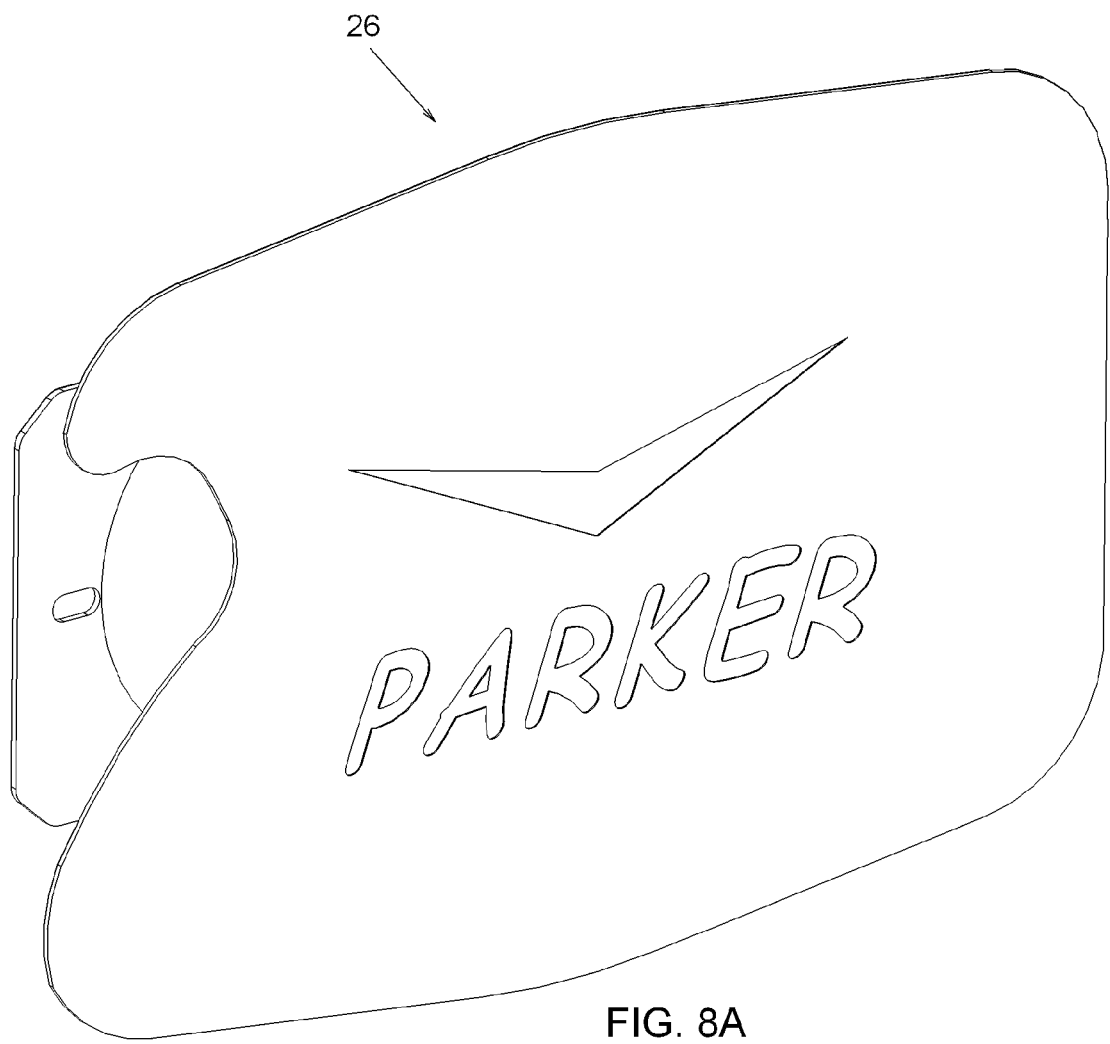
FIG. 8A is a front perspective view of one embodiment of a hose reel that may be used with the present invention.
Figure 8B:
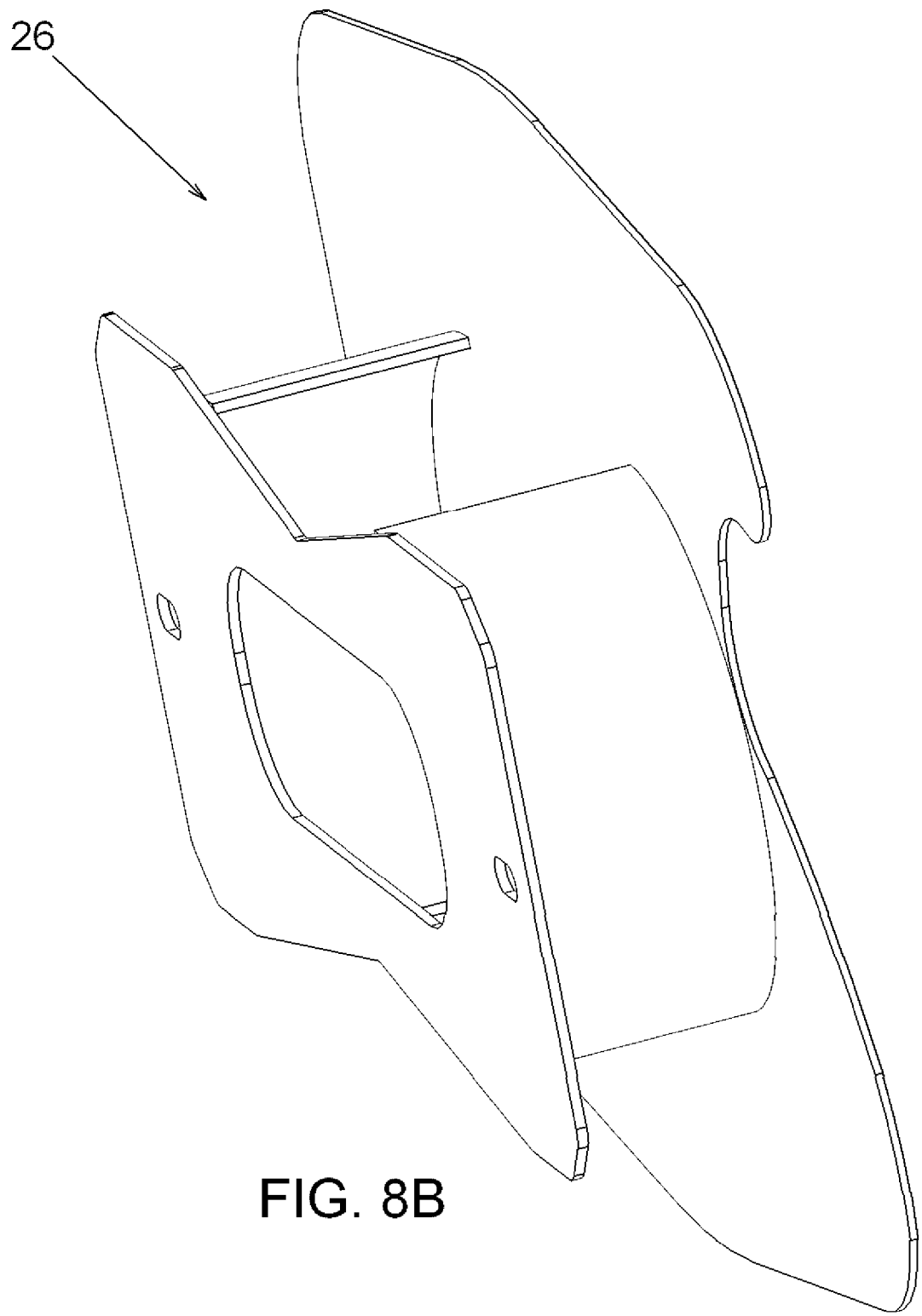
FIG. 8B is a rear perspective view of the hose reel of FIG. 8A.

Referring to FIGS. 1-3, one embodiment of a mobile leaf blower unit in accordance with the invention is designated by the numeral 10. Mobile leaf blower 10 includes a tubular frame 12 which supports engine 14 and blower unit 16, and is mounted on wheels 18. The handle 24 of the mobile leaf blower 10 may include a hose reel 26 (shown in FIGS. 8A and 8B) about which the flexible blower tube 22 can be wound when not in use. The hose reel 36 may be mounted to the handle 24 using screws, looped fasteners, or the like.

Figure 4A:
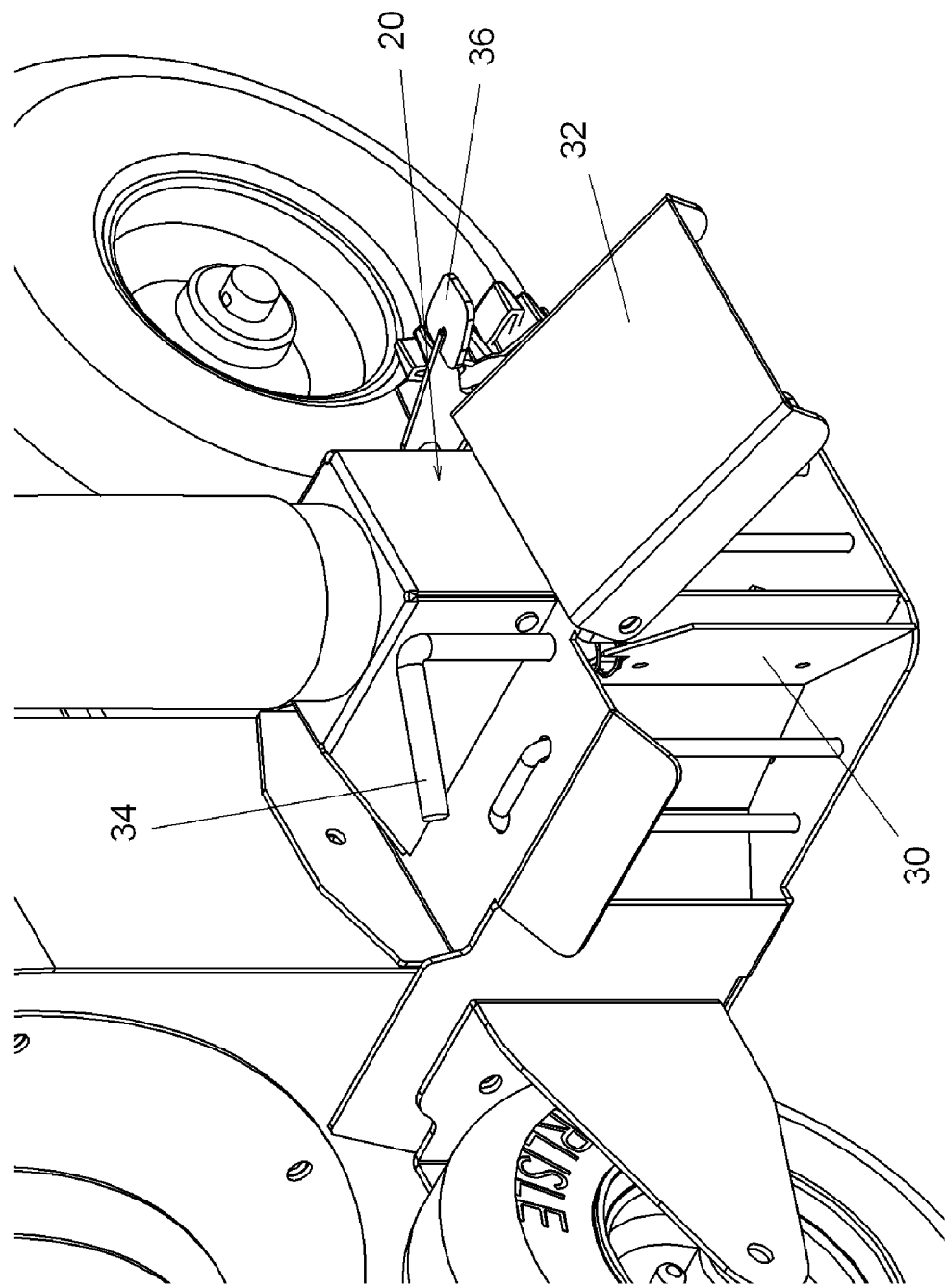
FIG. 4A is a detailed front perspective view of the air deflector box of the mobile ground leaf blower unit of FIG. 1, shown with the deflector plate handle in the down position.

As shown in more detail in FIG. 4A, mobile leaf blower 10 further includes an air deflector box 20 fixedly attached to the outlet of the blower unit 16. Connected to the air deflector box 20 is a flexible blower tube 22.

Figure 4B:
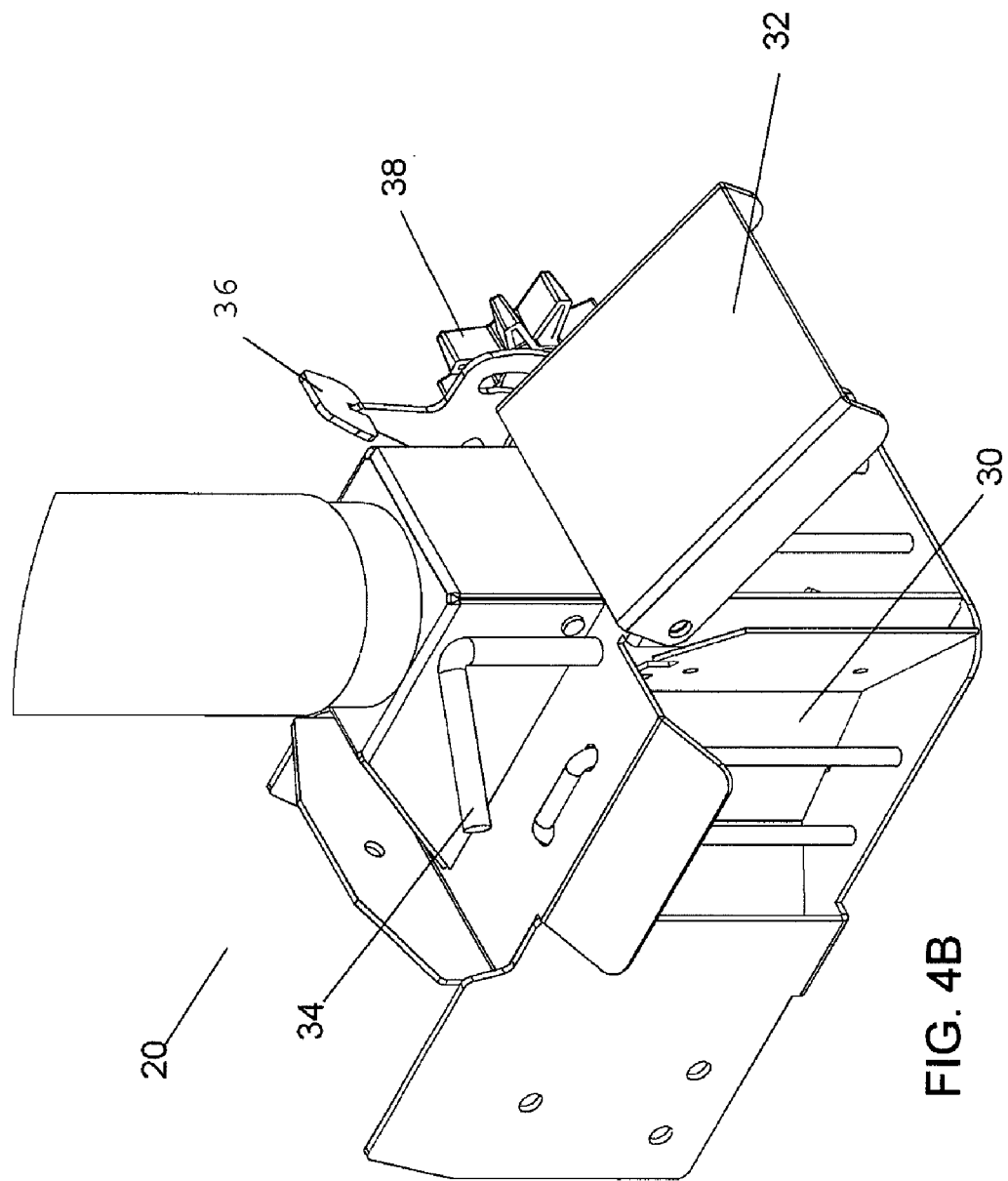
FIG. 4B is a detailed front perspective view of the air deflector box of FIG. 4A, shown removed from the blower unit and with the deflector plate handle in the up position.
Figure 4D:
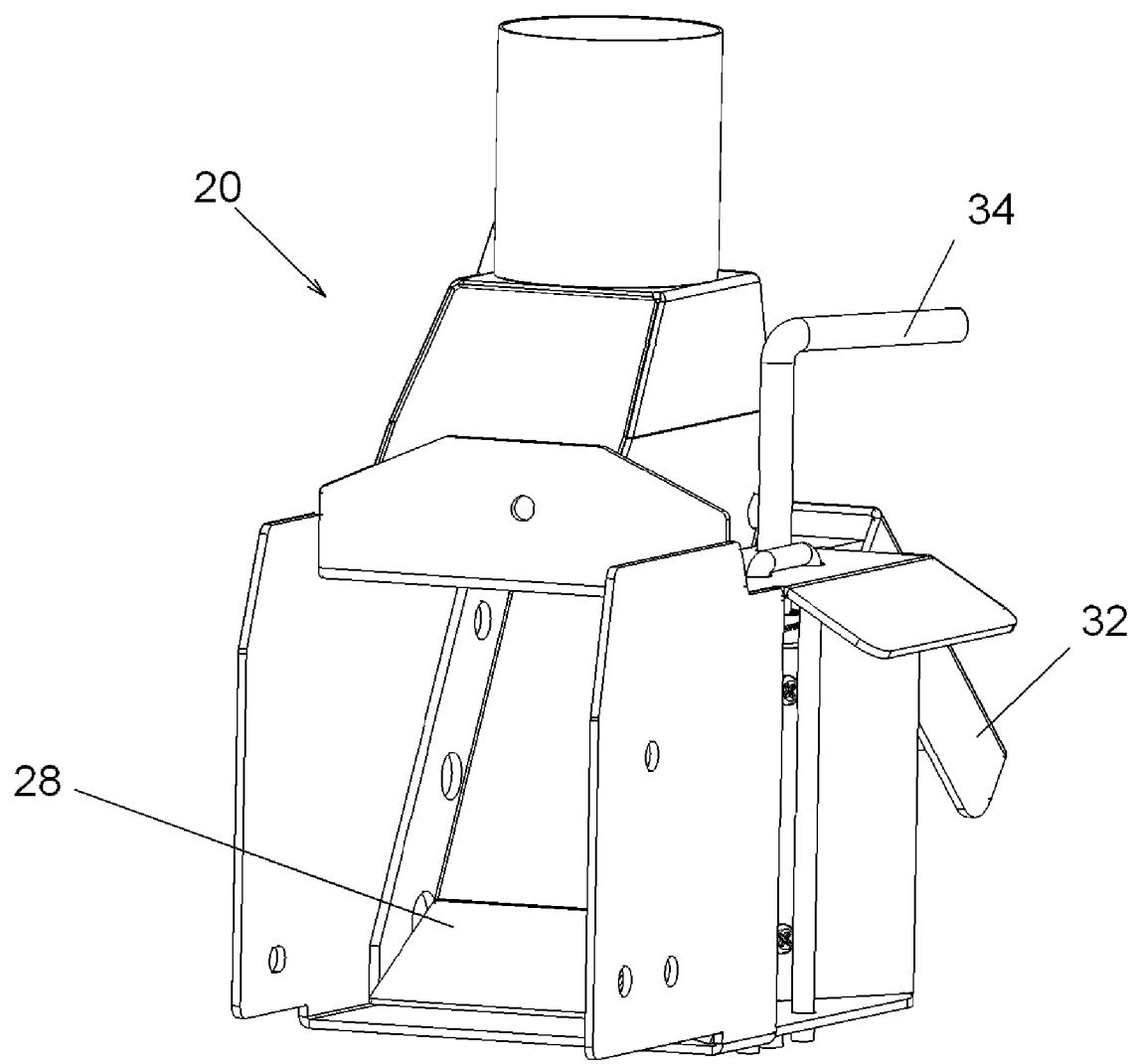
FIG. 4D is a detailed rear perspective view of the air deflector box of FIG. 4A, shown removed from the blower unit, with the deflector plate handle in the up position, and from an angle so that the interior of the air deflector box is visible.

FIGS. 4A-D are detailed views of the air deflector box 20 from several angles. The air deflector box 20 includes a positionable horizontal deflector plate 28 which guides air flow either to the flexible blower tube 22 or forward/sideways as directed by the vertical deflector plates 30. The air deflector box 20 includes vertical deflector plates 30 that guide air flow forward and sideways of the mobile ground leaf blower 10 when large areas are to be cleared of leaves or other debris. FIG. 4A shows the air deflector box 20 with the horizontal deflector plate handle 36 in the down position. FIGS. 4B-C show the air deflector box 20 with the horizontal deflector plate handle 36 in the up position. FIG. 4D shows the interior of air deflector box 20 when the horizontal deflector plate handle 36 is in the up position. Although the horizontal deflector plate handle 36 itself is not visible in FIG. 4D, this figure shows the positioning of the horizontal deflector plate 28 in the interior of the air deflector box 20 when the horizontal deflector plate handle 36 is in the up position.

Figure 5A:
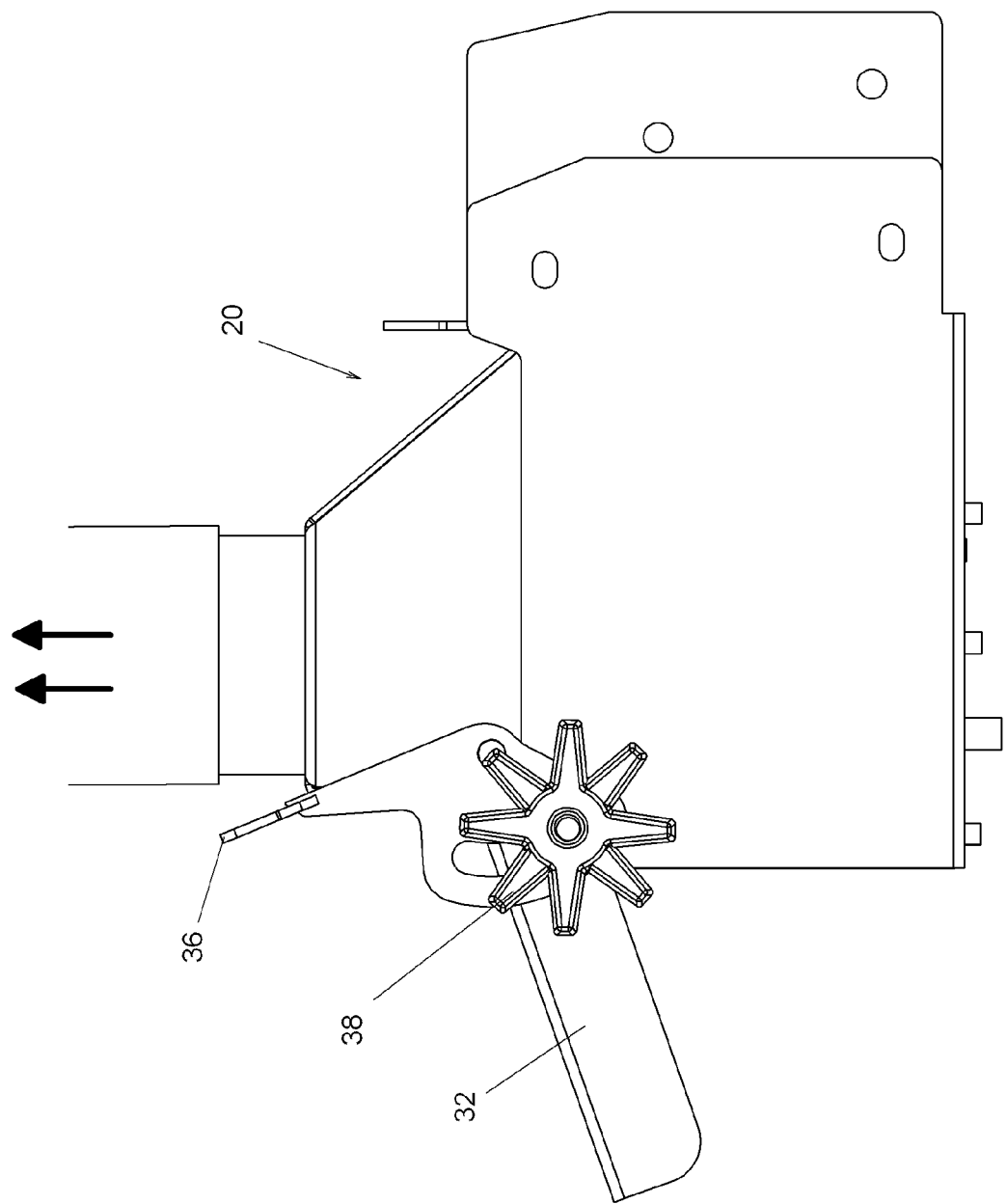
FIG. 5A is a back elevational view of the air deflector box of FIG. 4B, with the deflector plate handle in the up position.
Figure 5D:
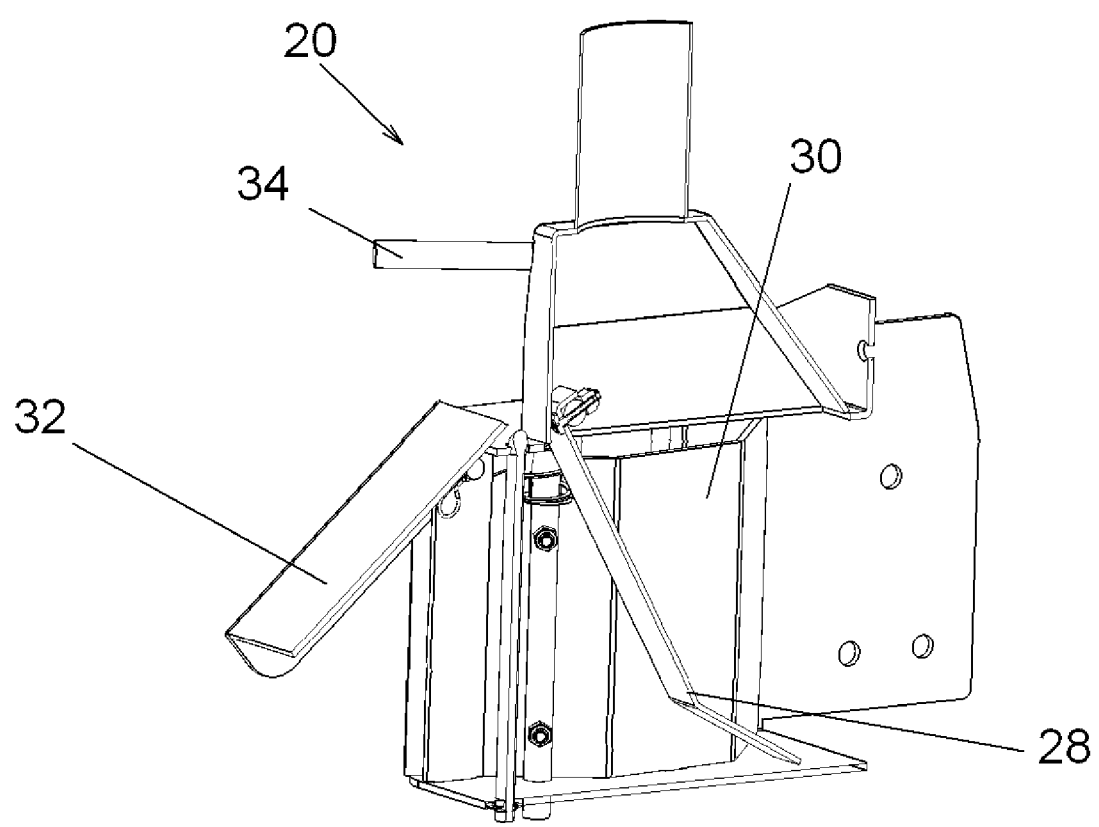
FIG. 5D is a perspective cross-sectional view of the air deflector box of FIG. 5C, with the deflector plate handle in the up position

Turning to FIGS. 5A-D, the air deflector box 20 is illustrated with the horizontal deflector plate handle 36 in the up position such that the horizontal deflector plate 28 is in the down position, as best seen in FIGS. 5C and 5D. In this position, as indicated by the arrows in FIG. 5A, the air flow from the blower unit 16 is deflected by the horizontal deflector plate 28 so as to flow into the flexible blower tube 22. At that time, no air (or only minimal air) is directed out of the blower unit 10 toward the ground, and the operator thus uses the air flow from the flexible blower tube 22 to clear leaves and debris from under shrubs and other hard-to-reach places. In this embodiment and as best seen in FIG. 5A, control lever lock 38 extending through a slot in horizontal deflector plate handle 36 is screwed down so as to retain the handle in the up position. Of course, other means for securing the horizontal deflector plate handle 36 in position could be used. With the configuration of horizontal deflector plate 28 as shown in this embodiment, airflow through the air deflector box 20 would also tend to maintain the horizontal deflector plate handle 36 in the up position (with the horizontal deflector plate 28 in the down position).

Figure 6A:
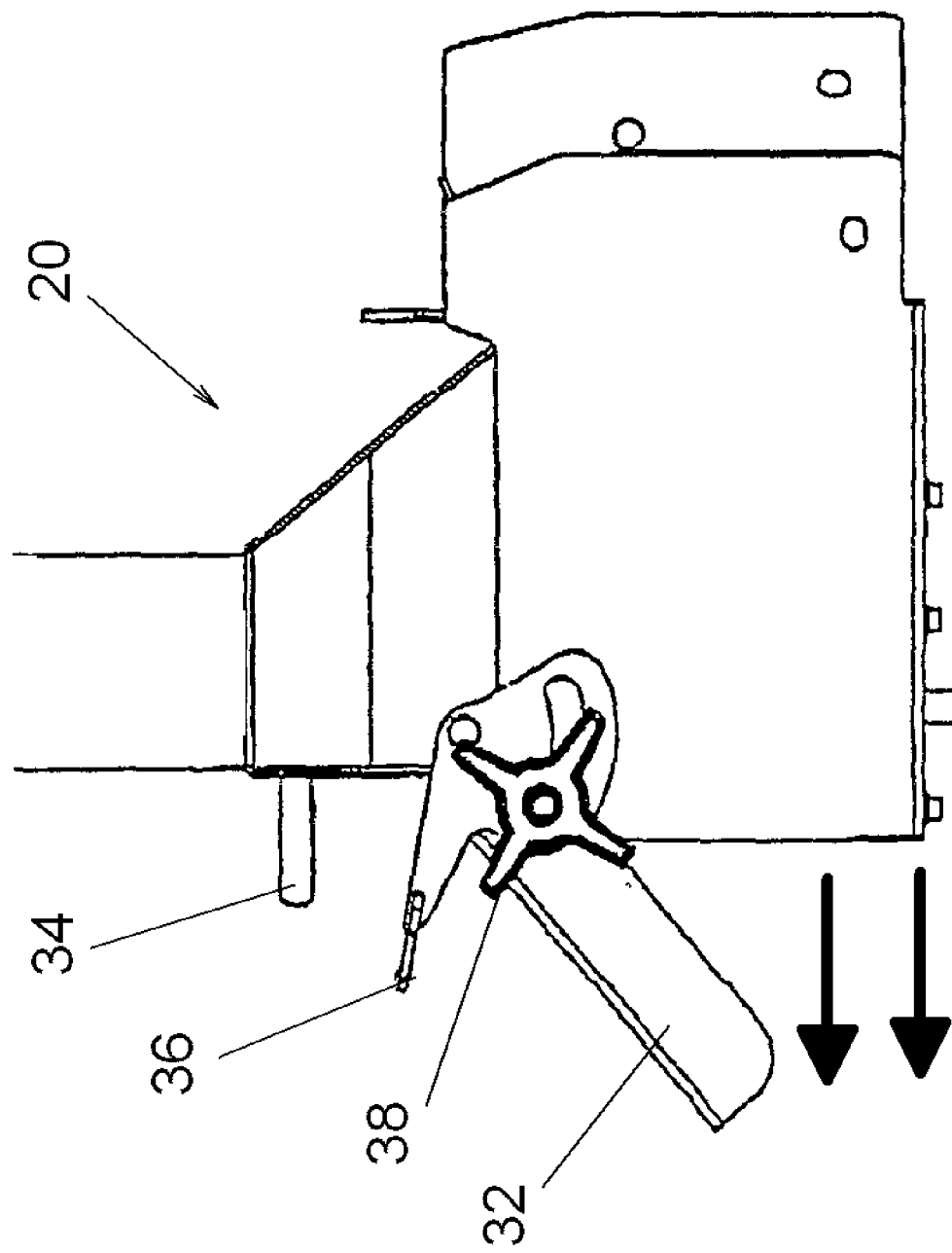
FIG. 6A is a back elevational view of the air deflector box of FIG. 4B, with the deflector plate handle in the down position.
Figure 6B:
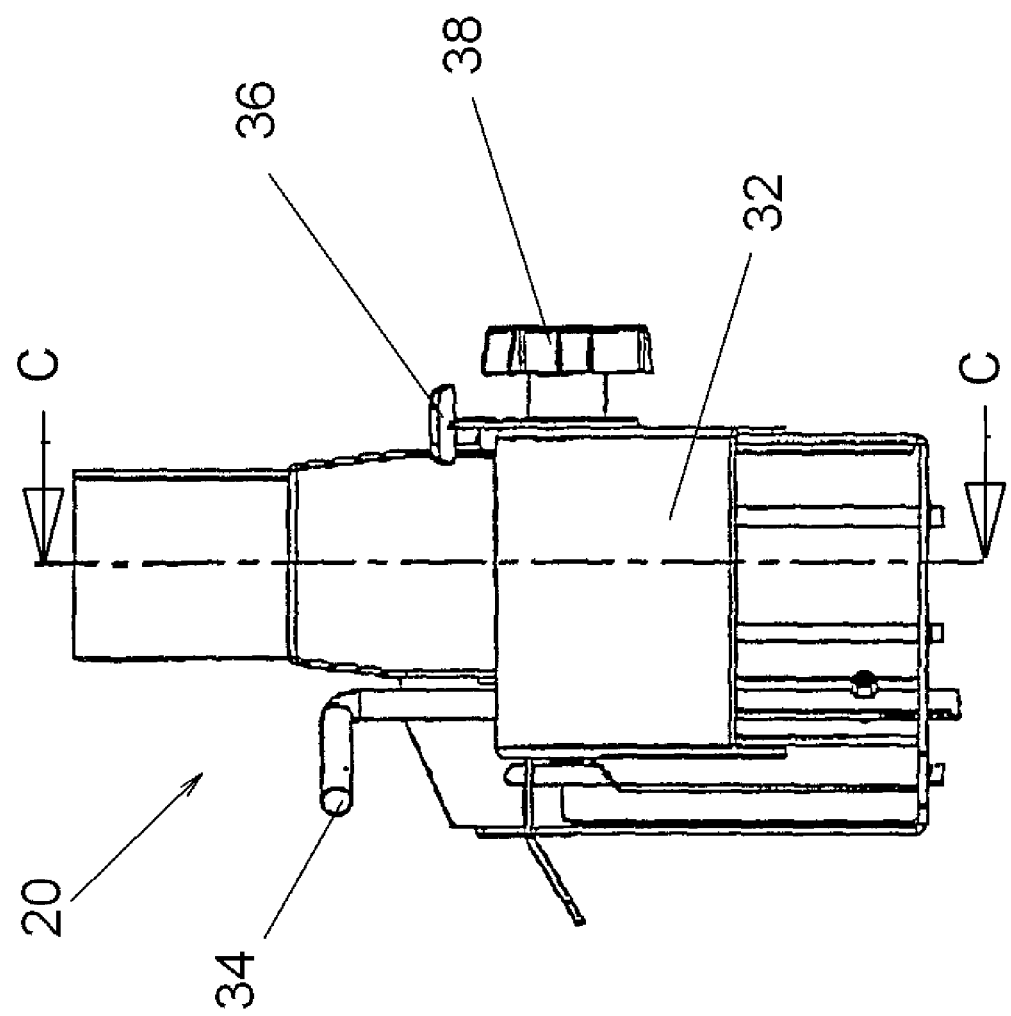
FIG. 6B is side elevational view of the air deflector box of FIG. 4B, with the deflector plate handle in the down position.

FIGS. 6A-C illustrate the position of the air deflector box 20 when the horizontal deflector plate handle 36 is in the down position, at which time the horizontal deflector plate 28 is in the up position. The position of the horizontal deflector plate 28 is particularly illustrated in FIG. 6C and, as best seen in FIG. 6A, control lever lock 38 extending through a slot in horizontal deflector plate handle 36 is screwed down so as to retain the handle in the down position. In this position, as indicated by the arrows in FIG. 6A, the air flow is directed past the vertical deflector plates 30 in order to provide a generally horizontal air flow both forward and sideways of the mobile ground leaf blower 10 in order to clear large areas such as lawns and driveways. If desired, vertical deflector plates 30 may also be positionable so as to direct the airflow either more sideways and out past flap door 32 (which helps prevent the air flow from going upward in the direction of the operator) or more forward. One embodiment for accomplishing this is the vertical deflector plate control level 34 as illustrated in the Figures but other means could be used. Additionally, flap door 32 may be fixed in position, adjustable using a locking mechanism similar to the control lever lock 38 mechanism or otherwise, or eliminated altogether if desired for particular designs of mobile leaf blower units 10.

It should be understood that the positioning of the horizontal deflector plate 28 and the vertical deflector plates 30 direct the airflow out of the mobile leaf blower unit 10. As such, if fully positionable deflector plates are used, the operator will be able to control where and how much airflow is directed out of each exit option.

Figure 7A:
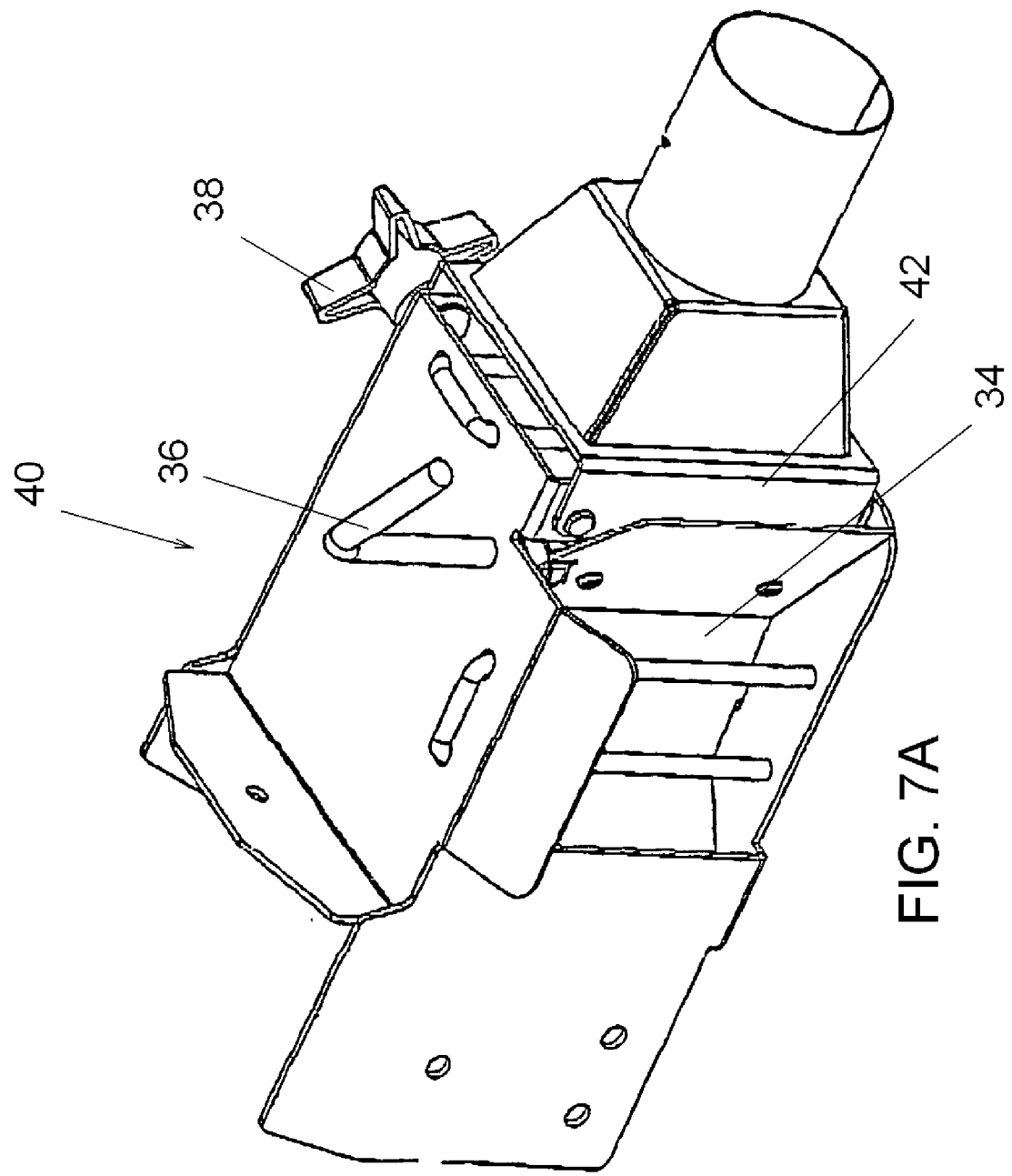
FIG. 7A is a perspective view of one alternative embodiment of an air deflector box in accordance with the invention.
Figure 7B:
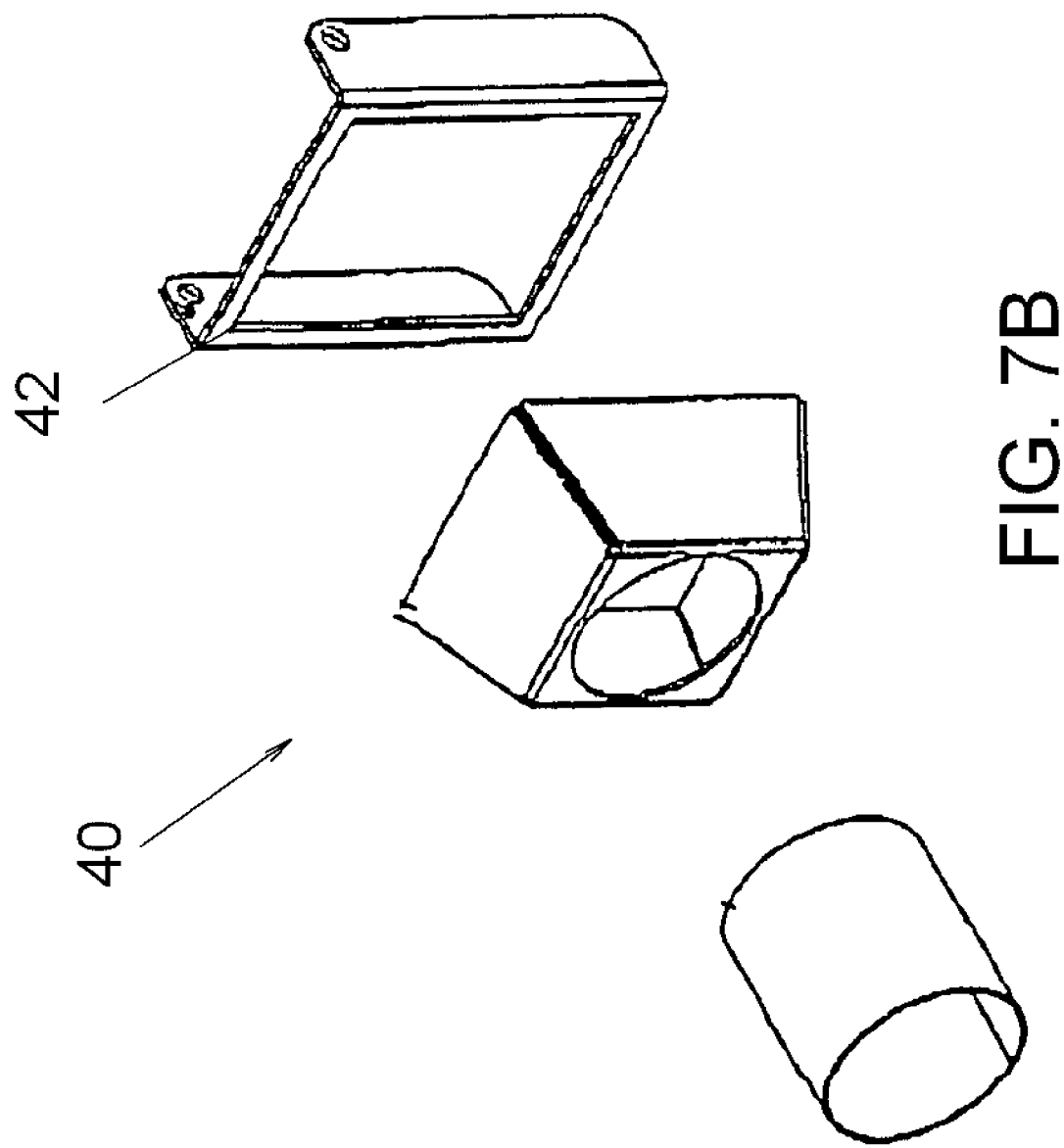
FIG. 7B is a perspective exploded view of the flap door hose attachment of the deflector box shown in FIG. 7A.

FIGS. 7A and 7B illustrate one alternative embodiment for the air deflector box 20 configuration although others could be designed by a person of skill in the art without departing from the invention. In this embodiment, a modified flap door flexible hose attachment unit 40, has a modified flap door 42 to which a flexible blower tube 22 can be attached. In this configuration, the airflow out of air deflector box 20 is sideways as opposed to vertical when the flexible blower tube is being used.

The advantage achieved by mobile ground leaf blower 10 is that, in effect, two machines are provided in a single apparatus, and there is no need for the operator to carry on his back, as in the prior art, a supplemental blower unit with a flexible hose attachment in order to reach leaves and debris in hard-to-reach places. As a result, the cost of manufacturing of the subject apparatus is significantly reduced as compared to the two pieces of different apparatus required by the prior art, and the operator experiences less fatigue during a leaf blowing operation.

Thus, it has been shown and described an improved mobile leaf blower unit including an air deflector box to which is attached a flexible blower tube. Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A mobile leaf blower unit comprising:
   a blower unit having an air discharge;
   an air deflector box positioned to receive air from the air discharge of the blower unit, the air deflector box having a plurality of exits
   at least one selectively positionable deflector plate that can be positioned to deflect air upwardly from the air discharge toward an exit in the air deflector box; and
   a location for attaching a flexible blower tube to an exit of the air deflector box, the flexible blower tube being capable of receiving and discharging air;
   wherein the mobile leaf blower unit is capable of being used for blowing either through the flexible blower tube or through the air deflector box itself.

2. The mobile leaf blower unit of claim 1 wherein the at least one selectively positionable deflector plate comprises a horizontal deflector plate.

3. The mobile leaf blower unit of claim 1 further comprising at least one vertical deflector plate.

4. The mobile leaf blower unit of claim 2 wherein the horizontal deflector plate is selectively positionable using a deflector plate handle.

* * * * *